Patented Mar. 27, 1945

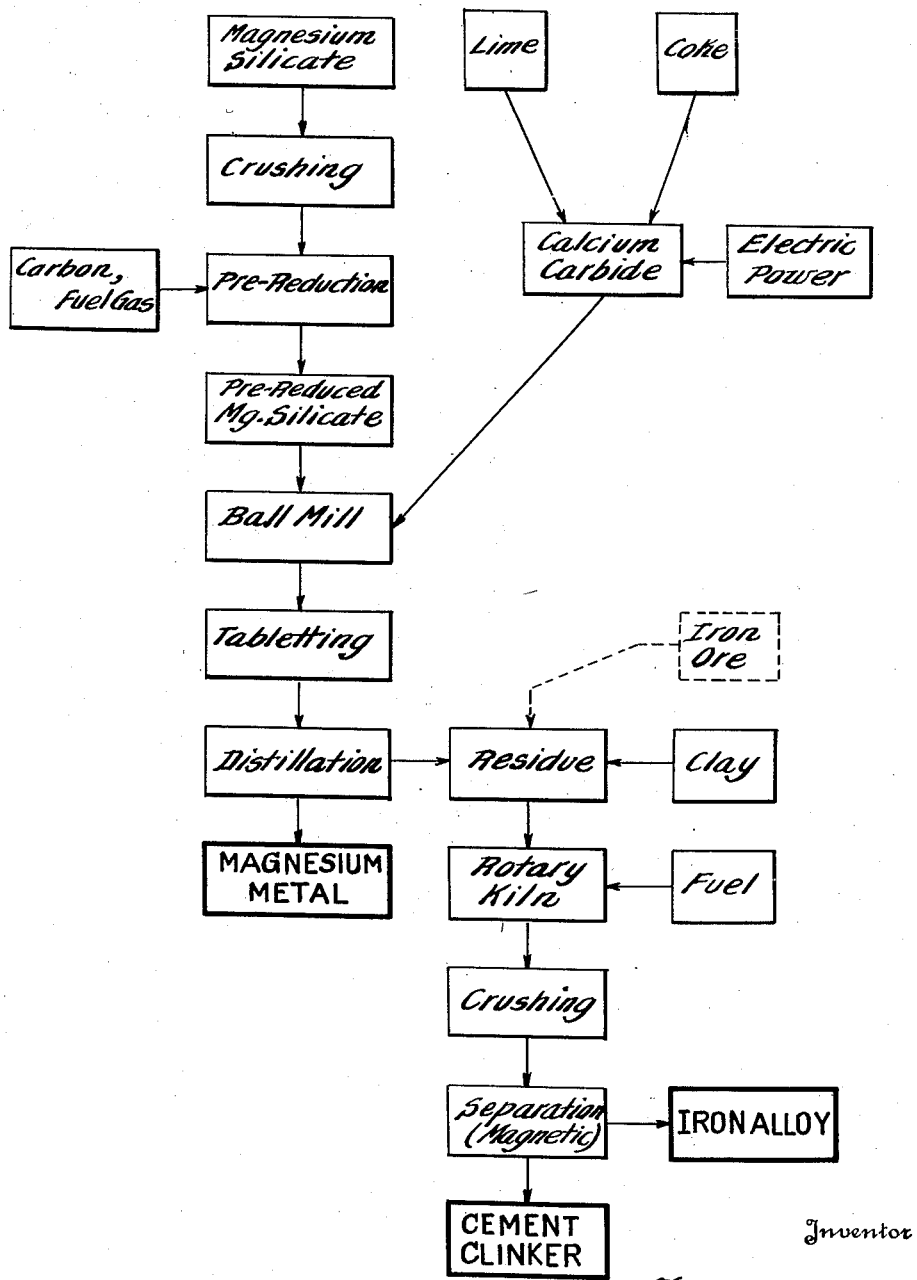

2,372,571

UNITED STATES PATENT OFFICE 2,372,571

PROCESS FOR MANUFACTURING METALLIC MAGNESIUM FROM MAGNESIUM SILICATES

Fritz J. Hansgirg, Black Mountain, N. C., assignor to North Carolina Magnesium Development Corporation, Asheville, N. C., a corporation of North Carolina Application October 19, 1943, Serial No. 506,868

8 Claims. (Cl. 75—67)

This invention relates to the production of metallic magnesium, and has for its general object the provision of novel processes for recovering the metal by direct reduction from magnesium silicates.

Included among other objects which will appear hereinafter, is the economical production of certain valuable by-products during the process of extraction of the magnesium from the silicates.

In general, magnesium occurs in two classes of minerals. In the case of one of these groups, which includes the mineral magnesite and dolomite, the magnesium oxide is bound to carbon dioxide; whereas in the other group, which includes the widely occurring minerals such as olivine, dunite, forsterite, and serpentine, the magnesium oxide is bound to silica. The minerals in the latter group not only occur in large deposits but are comparatively high in magnesium content. However, they have been much more difficult to reduce than the minerals of the first group, since the acid radical—carbon dioxide—of the first group, may be much more easily removed or separated by a simple heating process. Consequently, the industry is now employing magnesite and dolomite as starting materials for the production of magnesium.

Many attempts have been made to remove the acid portions from the silica-containing ores to which reference has been made, and such proposals have generally contemplated the treatment of such ores with strong mineral acids in order to form the magnesium salts of such acids, the silica being left behind undissolved. The particular mineral acid employed depends upon the subsequent processes intended to be pursued in the extraction and refinement of the magnesium. In case the electrolytic process is employed, hydrochloric acid is used to treat the magnesium silicate ores. Magnesium chloride is formed, which has to undergo a chemical treatment necessary to form anhydrous magnesium chloride suitable for pursuing the electrolytic process. In case a thermal reduction process is contemplated, the magnesium silicates are treated with sulphuric acid, the resulting magnesium sulphate being easily decomposed to magnesium oxide and the sulphuric acid recovered to be reintroduced in the extraction process.

The chief difficulties which attend all of these processes reside in the facts that the silica has a tendency to form a colloidal gel which is very difficult to filter, and that the natural ores contain other compounds than magnesium silicate. These ores usually contain large amounts of other elements such as iron, chromium, titanium, nickel, manganese, aluminum, and calcium. These elements also form chlorides or sulphates in the acid treatment, and further chemical treatment is necessary to isolate the pure magnesium chloride or magnesium oxide.

The above described proposals have failed to replace the methods which involve the treatment of magnesite or dolomite, on account of the greater expense necessary for the construction of plants, and the high consumption of costly acid, and the use of power. The proposed processes are also more expensive than those which utilize magnesium chloride obtained from salt brines or sea water.

Contrasted with the acid methods just described are the direct methods of producing metallic magnesium from magnesium silicates. These may be classified in two groups. In pursuing processes under the first group, reducing agents are employed which form, with the metallic magnesium, gaseous products of reaction, for example, the reduction of magnesium oxide with carbon which results in the formation of a mixture of magnesium metal vapor and carbon monoxide. Methods in the second group involve the use of reducing agents which form non-gaseous products of reaction, for example, the reduction of magnesium ores with silicon, aluminum, calcium carbide, or silicon carbide. After the magnesium has been evaporated, solid or liquid oxygen containing compounds remain as by-products of the reduction process. The processes in the first group which involve carbo-thermic reduction processes would not be practical because at the high temperature of reduction necessary it is impossible to prevent the silica from being reduced to silicon. This would mean that the magnesium vapors would be diluted by the large amount of carbon monoxide resulting from the reduction of the silica.

Among the processes in the second group, the reduction with silicon is not preferred on account of the additional silica formed during the reduction process, which according to equilibrium conditions would result in a very incomplete reduction of the magnesium oxide.

Therefore, the most practicable remaining processes are those which involve the use of aluminum or calcium carbide. Aluminum forms aluminum silicate after the magnesium has evaporated, and the use of calcium carbide results in the formation of calcium silicate and carbon.

The use of calcium carbide as a reducing agent for magnesium oxide is already known. For example, in my co-pending application, Serial No. 357,199, filed September 18, 1940, I have disclosed a process for reducing pure magnesium oxide by calcium carbide. That process was a combination method in which the residue from the reduction step is a mixture of calcium oxide and carbon, which was used to precipitate fresh magnesium oxide from sea water. However, none of the known applications of the calcium carbide as a reducing agent made use of the fact that this compound can be particularly successfully used for the reduction of magnesium silicates. This has been especially true since the calcium oxide formed during the reduction reacts with the remaining unreduced silica to form calcium silicate as a residue. In fact, in processes for the reduction of magnesium oxide with the silicon, it has been found that the reduction is very incomplete, if the silicon produced during such reduction is not removed by forming other silicates which are more difficult to reduce. Therefore, for the silicon reduction process, roasted dolomite—a molecular mixture of calcium and magnesium oxide—is used as a starting material, the magnesium oxide being reduced by the silicon, forming magnesium vapors and silica, which silica immediately combines with the calcium oxide present to form calcium silicate.

The invention, in one of its simpler embodiments, contemplates the provision of a process which involves the making of an intimate mixture of magnesium silicate with the stoichiometric amount of calcium carbide. This mixture is preferably pressed into tablets or briquettes with or without a binder, and heated to a temperature high enough to evaporate the magnesium. The solid residue formed consists of calcium silicate and carbon. The temperature to which the starting materials have to be heated depends upon the gas pressure conditions surrounding the evaporation of the magnesium. In a vacuum between 0.1 mm. and 10 mm. of mercury, temperatures of between about 950° C. and about 1150° C. are sufficient. If the reaction is carried on at atmospheric pressure, temperatures up to about 1450° C. are necessary. Due to the fact that the magnesium is evolved as a vapor and that the starting materials have been finely ground, the reaction is practically complete, or at any rate, to an efficiency up to approximately 95%.

Such a simple process as thus described can only be pursued if substantially pure magnesium orthosilicate is available as the starting material. However, all of the silicates found in nature contain considerable amounts of other compounds which are also capable of reduction by the calcium carbides, and thus an unnecessary consumption of this relatively costly agent would be involved. Therefore, it is necessary that the complex magnesium silicates, as mined, undergo a pretreatment in order that the calcium carbide used to be held to the amount necessary only for the reduction of the magnesium oxide contained in the ore. The invention thus contemplates such a pretreatment which is substantially a prereduction process applied to the natural ore during which all of the oxides of heavy metals which may be present (for example, the oxides of iron, nickel, chromium, titanium, and manganese), are reduced to the metallic state, while the magnesium oxide and the oxides of calcium and aluminum remain unreduced. Calcium oxide, of course, cannot be reduced by calcium carbide, and if the aluminum oxide should be temporarily reduced, the metallic aluminum formed immediately acts as a reducing agent on the magnesium oxide, so that in the end the aluminum remains in the form of the oxide.

Such prereduction can be readily performed. The magnesium silicate ore is preferably crushed in a conventional crusher to a diameter size of $\frac{1}{16}''$ to $\frac{1}{2}''$, and the resulting mass is treated with a suitable reducing agent such as carbon. The prereduction is preferably effected in a shaft furnace or rotary kiln under an air blast. Natural gas, industrial gases like coke-oven gas, water gas, and hydrogen can also be used for effecting this prereduction. Also in case serpentine is used as the starting material, the prereduction process removes the water which is a constituent of this mineral, whereby pure magnesium orthosilicate is obtained along with the metals from the oxides which accompany the mineral and which vary in type and amount in accordance with the deposit where the mineral is found.

Some of the most interesting minerals which may be used as raw materials in the present processes are the olivines, which occur in large deposits in the western parts of North Carolina, Tennessee, and Georgia. These minerals contain between 45% and 50% magnesium oxide and up to about 43% silica. The theoretical composition of magnesium orthosilicate is 57% magnesium oxide and 43% silica. Therefore, in the natural product the silica is in excess of the magnesium oxide. Now the calcium carbide, as produced under normal conditions, contains about 85% carbide ($CaC_2$) and the remainder mostly calcium oxide. This calcium oxide content provides the necessary additional lime to react with the excess silica contained in the magnesium silicate ores to form calcium orthosilicate. If the calcium carbide is especially prepared as a reducing agent for use in these processes, care should be taken to insure that the material contains the proper stoichiometric amount of calcium oxide with relation to the excess silica to form calcium orthosilicate. This special feature of the invention not only aids in the reactions, but is of considerable economical importance, since it is known to those skilled in the art that the cost of calcium carbide is lowered if the total carbide content is less than 85%. Therefore, it is an important feature of the present invention to employ a calcium carbide having a lime content especially adapted to the raw material used in the reduction process.

Some of the magnesium silicates occurring in nature, for example, the chlorite group, contain considerable amounts of alumina. If such raw materials are used in the magnesium reduction process, a residue is formed which can be directly melted or sintered to cement clinker. The carbon contained in the residue acts as an additional fuel source for the sintering of the clinker. However, when raw materials of the olivine or serpentine type are used, additional alumina in the form of clay has to be added in case the residue is to be used in manufacturing cement, since these starting materials are poor in alumina. The heavy metals contained in the residue from the magnesium reduction process melt together during the reaction and form metal grains consisting mainly of steel alloyed with other constituents contained in the mineral, these metallic constituents varying according to the composition of the raw materials used. These alloyed steel granules are especially easily formed if a rotary kiln is used to melt the cement clinker, and they may be readily separated and recovered—after the clinker is crushed—for example, by magnetic separation methods.

Some of the magnesium silicate ores which are used as a source of magnesium do not have a very high iron content. In such cases it would be difficult to collect the iron alloy in large granules during the melting or sintering of the cement clinker; therefore, it is advisable to add iron ores to the residue from the magnesium reduction in such amounts that the carbon contained in the residue from the calcium carbide decomposition is sufficient to reduce such added iron ores to metallic iron. This metallic iron will melt together with the other metallic constituents of the residue and so form an iron alloy which is separated from the clinker in the usual way.

The flow sheet shown in the drawing traces the various steps of the methods to be pursued according to the present invention. Certain deviations from the complete process illustrated by the flow sheet may be made according to the nature of the materials used, and the by-products which it may be desired to obtain. For example, the prereduction steps may be omitted when the magnesium orthosilicate is relatively pure. Furthermore, the additions of the clay or of the iron ore to the residue are alternative depending upon the iron and alumina content of the starting materials.

The invention will be best understood by reference to the following detailed example, using olivine as raw material, containing 49% magnesium oxide, 42% silica, 7% iron oxide and 2% chromium titanium oxide.

One hundred pounds of such olivine rock is crushed in a jaw crusher, and after crushing, about three pounds of anthracite is added, and the whole mixture is charged for prereduction in a rotary kiln where it is heated up to about 900° C. to 1000° C.

After the prereduction is complete, the mass is cooled so that it can be charged into a ball mill and ninety pounds of calcium carbide containing 86% of pure calcium carbide are added and the whole mass is ground to about 200 mesh. The ground mixture of prereduced olevine and carbide is transported from the ball mill to a silo and from there charged to a tabletting machine to press the fine dust to tablets of a size between one half inch to one inch, and the tablets are then charged into a retort. The retort is evacuated to about 1 mm. vacuum, and the charge is heated to 950° C. The magnesium evaporates and condenses in the cooler part of the retort. After a few hours the vacuum is released, the retort opened and the magnesium withdrawn. Between twenty-six and twenty-eight pounds of magnesium will be recovered as a solid metal ring.

The residue having a weight of around one hundred and sixty-five pounds is withdrawn from the retort. After adding between twenty to twenty-five pounds of dry clay, the mass is charged into a rotary kiln and heated to the usual temperature to melt cement clinker. After burning out the carbon contained in the charge there results about one hundred and fifty pounds of cement clinker, from which ten pounds of chromium titanium ferrous alloy can be recovered by magnetic separation, with a chromium titanium content around 10%.

Other changes and modifications may be made in the method as described and illustrated herein without departing from the scope of invention as defined by the subjoined claims.

Having thus described the invention, what is claimed as new and desired to be secured by Letters Patent is:

1. A process for producing magnesium from magnesium silicate ores, which comprises the steps of heating said ores with a reducing agent whereby the heavy metal oxides are reduced to the metals, then reacting the resulting mixture with the stoichiometric quantity of calcium carbide based on the percentage of magnesium oxide in the reduced ore, the reaction temperature being sufficiently high to evaporate the magnesium, and condensing the magnesium vapors.

2. A process for producing magnesium from magnesium silicate ores, which comprises the steps of subjecting the ores to a prereduction by heating said ores with carbon, whereby the heavy metal oxides are reduced to the metals, then reacting the resulting mixture with the stochiometric quantity of calcium carbide based on the percentage of magnesium oxide in the reduced ore, the reaction temperature being sufficiently high to evaporate the magnesium, and condensing the magnesium vapors.

3. A process for producing magnesium from magnesium silicate ores, which comprises the steps of heating said ores with a reducing agent whereby the heavy metal oxides are reduced to the metals, then reacting the resulting mixture with raw calcium carbide containing the stoichiometric quantity of calcium carbide based on the percentage of magnesium oxide in the reduced ore, and also containing the substantially stoichiometric amount of calcium oxide to convert the excess silica contained in the ore to calcium orthosilicate, the reaction temperature being sufficiently high to evaporate the magnesium, and condensing the magnesium vapors.

4. A process for producing metallic magnesium cement clinker, and ferrous alloys from complex magnesium silicate ores which comprises the steps of subjecting the ores to a prereduction by heating said ores with a reducing agent whereby the heavy metal oxides are reduced to the metals, reacting said prereduced ores with calcium carbide at elevated temperatures, evaporating the magnesium, sintering the residue to a mixture of cement clinker and iron alloys, crushing said residue, and separating the alloy constituent from the clinker.

5. A process for producing metallic magnesium, cement clinker, and ferrous alloys from complex magnesium silicate ores which comprises the steps of subjecting the ores to a prereduction by heating said ores with a reducing agent whereby the heavy metal oxides are reduced to the metals, reacting said prereduced ores with calcium carbide at elevated temperatures, evaporating the magnesium, supplying any deficiency of alumina for the clinker by adding clay to the residue, supplying any deficiency in iron for the ferrous alloys by the addition of iron ore to the said residue, sintering the residue to a mixture of cement clinker and iron alloys, crushing said residue, and separating the alloy constituent from the clinker.

6. A process for producing metallic magnesium, cement clinker, and ferrous alloys from complex magnesium silicate ores which comprises the steps of subjecting the ores to a prereduction by heating said ores with a reducing agent whereby the heavy metal oxides are reduced to the metals, reacting said prereduced ores with calcium carbide at elevated temperatures, evaporating the magnesium, supplying any deficiency in iron for the ferrous alloys by the addition of iron ore to said residue, the amount of iron ore added being proportional to the amount of carbon in the residue available for reduction purposes, sintering the residue to a mixture of cement clinker and iron alloys, crushing said residue, and separating the alloy constituent from the clinker.

7. A process for obtaining values from olivine ores containing chromium, which comprises the steps of subjecting the ores to a prereduction by heating said ores with a reducing agent whereby the heavy metal oxides are reduced to the metals, reacting said prereduced ores with calcium carbide at elevated temperatures, evaporating the magnesium, sintering the residue to a mixture of cement clinker and iron-chromium alloy, crushing said residue, and separating the alloy constituent from the clinker.

8. A process for producing metallic magnesium, cement clinker, and ferrous alloys from complex magnesium silicate ores which comprises the steps of subjecting the ores to a prereduction by heating said ores with carbon whereby the heavy metal oxides are reduced to the metals, reacting said prereduced ores with calcium carbide at elevated temperatures, evaporating the magnesium, sintering the residue to a mixture of cement clinker and iron alloys, crushing said residue, and separating the alloy constituents from the clinker.

FRITZ J. HANSGIRG.